United States Patent Office 2,795,373
Patented June 11, 1957

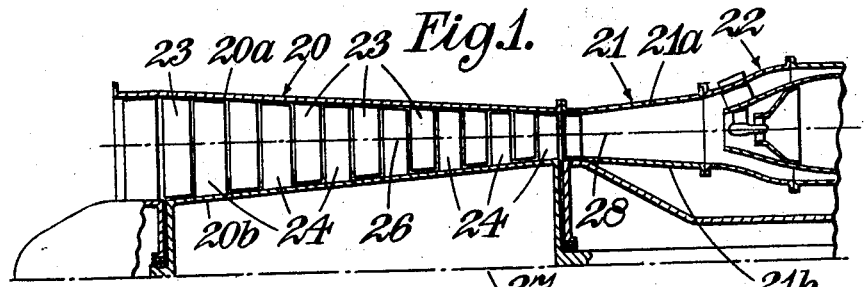
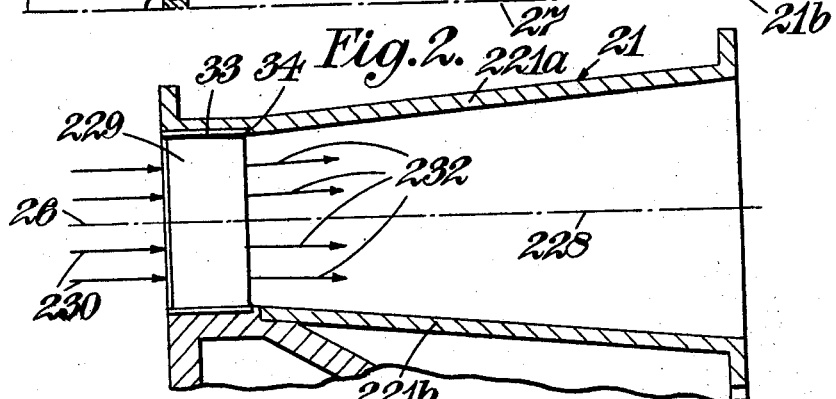
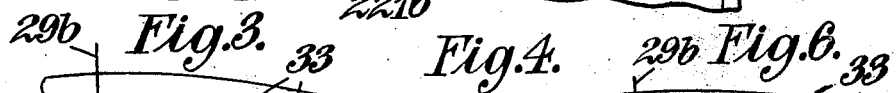
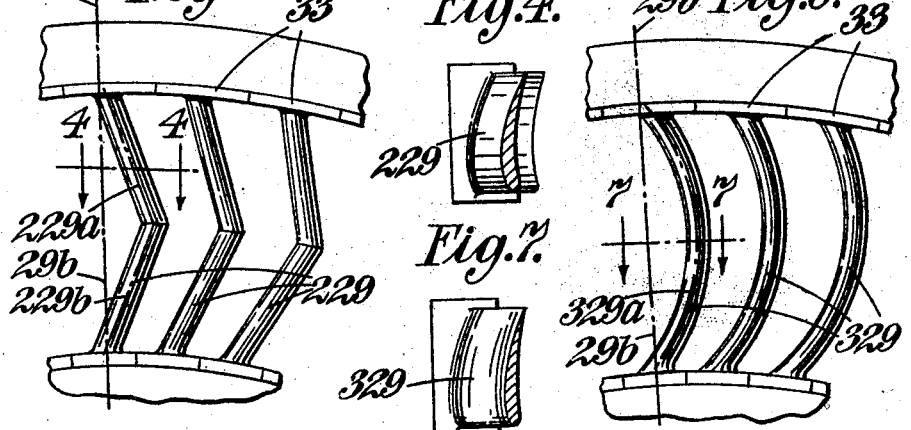
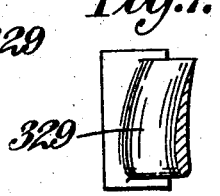
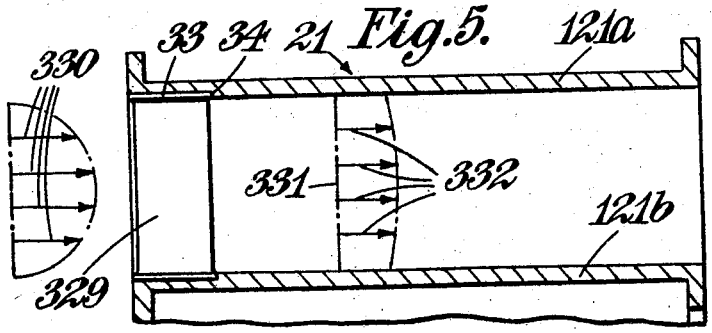

2,795,373

GUIDE VANE ASSEMBLIES IN ANNULAR FLUID DUCTS

Colin Taylor Hewson, Allestree, Derby, England, assignor to Rolls-Royce Limited, Derby, England, a British company Application February 23, 1951, Serial No. 212,270

Claims priority, application Great Britain March 3, 1950

5 Claims. (Cl. 230—132)

This invention relates to guide-vane assemblies for use in annular ducts arranged so that the principal flow direction is axially of the duct. The invention is concerned with guide-vane assemblies of the kind comprising a set of blades circumferentially distributed in the duct and arranged each with its spanwise axis, that is the line joining the centers of gravity of the blade sections, extending across the duct from an inner wall to an outer wall, which guide-vane assemblies are provided to impose or remove a rotational or swirl velocity component on a fluid flowing through the annular duct in a direction substantially axially of the duct.

The primary object of the invention is to provide a guide-vane assembly of the kind specified which will direct the flow of fluid therethrough in a desired manner according to design requirements.

According to the present invention, there is provided in combination with an annular fluid-conveying duct having an inner wall and an outer wall encircling and radially spaced from said inner wall to afford an annular axially-extending fluid passage with an inlet at one end of the duct structure and an axially-spaced outlet at the other end of the duct structure so that the principal direction of flow of the conveyed fluid is axially of the duct structure, a guide vane assembly comprising a set of blades distributed circumferentially around the fluid passage, each blade of the guide vane assembly being mounted to extend outwardly across the passage from said inner wall to said outer wall and each blade of the guide vane assembly being cambered to have a convex surface on one side extending from its leading edge to its trailing edge, and to have a concave surface on the other side extending from its leading edge to its trailing edge, and the blade being bent along its span so that along that part of its span adjacent the inner wall of the duct the convex surface faces towards the outer wall, and along that part of its span adjacent the outer wall of the duct the convex surface faces towards the inner wall.

Hitherto, it has been the practice to arrange the blades of the assembly with their spanwise axes extending on lines which are substantially radial to the axis of the annular duct. In such an arrangement, the fluid flows through the guide-vane assembly without substantial deflection radially of the axis of the duct, except insofar as the walls of the duct may impose constraint on the flow in the radial sense.

The guide vane arrangement of the invention enables a predetermined radial component of velocity to be given to a conveyed fluid, which radial component of velocity may be advantageous for a variety of purposes.

Thus in one arrangement, the blade is formed so that its spanwise axis comprises a number of intersecting straight lines which are inclined to one another; for example, a blade may comprise two spanwise parts each having its spanwise axis inclined to the radius drawn from the axis of the duct, the one part being given such aerofoil section as to impart to the fluid an outward radial component of velocity and the other part being given such aerofoil section as to impart a radially inward component of velocity to the fluid. By making the first part outermost in a blade and the second part innermost, then the guide-vane assembly will be such as to tend to decrease the axial velocity component in the centre of the duct assembly on the downstream side of the assembly and increase the axial velocity adjacent the walls, thereby, for example to cause a redistribution of the total pressure head in the gas flow to correct for boundary layer losses on the upstream side of the assembly, which losses may cause a mal-distribution of the total pressure head.

In another arrangement, a similar effect may be obtained in the use of blading which is curved spanwise.

The invention has an important application in guide-vane assemblies in annular ducts conveying a gaseous medium, such as for example are provided by the working fluid ducts of axial-flow compressor or turbine apparatus. In such apparatus, it is the practice to utilise rings of stationary blades, each ring constituting a guide-vane assembly in an annular duct passage for the purpose of imposing on the working fluid a rotational or swirl velocity component about the axis of the annulus, for the purpose for example of ensuring that the angle of the incidence of the working fluid on rotating blading is correct or to give a desired angle of discharge from the compressor or turbine.

Thus it is an important feature of this invention, to employ a guide-vane assembly according to this invention in an annular flow duct of an axial-flow compressor or turbine apparatus.

One application of the invention is in stator blading of intermediate compressor stages, where the inclination of the spanwise axis, by using blades of straight or of curved form, can be used for varying or correcting the axial velocity distribution radially of the duct.

Blades with curved or cranked spanwise axes may be used at the outlet from an axial compressor to assist in deflecting the gas along inner and outer walls of a diffuser, thus tending to suppress separation and increase the efficiency of diffusion.

Some embodiments of this invention will now be described with reference to the accompanying drawings in which:

Figure 1 illustrates diagrammatically in part axial section a portion of a gas-turbine engine, Figure 2 is an enlarged view of part of Figure 1 illustrating an application of the apparatus of this invention, Figure 3 is a view on the left-hand end of Figure 2, Figure 4 is a section on the line 4—4 of Figure 3, Figures 5 and 6 are further views illustrating another application of the invention, Figure 7 is a section on the line 7—7 of Figure 6.

Referring to the drawings, Figure 1 illustrates part of a gas-turbine engine in axial section. The gas-turbine engine comprises an axial-flow compressor indicated at 20, a compressed air delivery section 21 and combustion equipment indicated at 22 connected to receive compressed air from the delivery section 21. The compressor comprises an outer casing 20a carrying a number of rings of stator blades 23 and a rotor drum 20b carrying a number of rows 24 of rotor blading.

The working fluid of the engine flows through an annular passage comprising a first part defined between an inner wall constituted by the surface of the rotor drum 20b and an outer wall constituted by the casing 20a of the compressor, a second part which is a continuation of the first part and is comprised between an inner annular wall 21b and an outer wall 21a, and a third part constituted by the combustion equipment 22 which may be of any convenient form. The working fluid is heated in the combustion equipment 22 and then passes to a turbine (not shown) which is arranged to drive the compressor rotor say through a shaft 25.

The cross-sectional area of the annular working fluid passage usually decreases in the direction of flow of the working fluid through the compressor and in the construction illustrated in Figure 1 the compressor casing 20a and surface of the rotor drum 20b are both frusto-conical and are arranged so that they converge in the direction of flow, the larger diameter end of the one being arranged adjacent the smaller diameter end of the other.

The delivery section 21 of the compressor is of diverging cross section in the direction of flow of the working fluid through the engine, the inner wall 21b being substantially frusto-conical and converging in the downstream direction and the outer wall 21a being frusto-conical with its larger diameter end located at the downstream end. The centre line 28 of the diffuser section 21 forms a continuation of the centre line 26 of the compressor annulus.

Referring now to Figures 2, 3 and 4, there is illustrated an arrangement of the invention in which the walls 221a, 221b of the delivery section 21 are divergent as shown in Figure 1 so that the section acts as a diffuser and in which the centre line 228 forms a continuation of the centre line 26 of the compressor annulus. In order to improve the diffusing action of the section 21, each blade 229 which is of aerofoil section is formed to have a spanwise axis comprising a plurality of rectilinear parts, which parts are inclined to one another. In the construction illustrated, as will best be seen from Figure 3, the spanwise axis of a blade comprises two parts 229a and 229b and each of these parts is inclined to the radius 29b from the axis of the engine. The blades 229 are thus of cranked or dog-legged form, the outer and inner halves being substantially of equal length. In this arrangement the blades are given a profile such as that illustrated in Figure 4, and with such an arrangement the outer half of each blade imparts to the working fluid flowing over it an outward radial component of velocity, and the inner half of each blade imparts to the working fluid flowing over it an inward radial component of velocity, so that if the velocity distribution of the working fluid at the entry to the guide vane assembly formed by the blades 229 is represented by the arrows 230, then the velocity distribution at the outlet from the guide vane assembly may be represented by the arrows 232 in which the outer arrows diverge from the inner arrows.

Referring now to Figures 5 to 7, there is illustated another form of guide-vane assembly by means of which a redistribution of velocities radially of a duct can be achieved. In this arrangement there is provided at the entry to the delivery section, which is illustrated for convenience as being of uniform cross-sectional area throughout, a guide-vane assembly comprising a number of blades 329 which have curved spanwise axes 329a, so that in effect the blades impart differing radial components of velocity to the working fluid at each point along their lengths. If, for instance, the velocity distribution at the entry to the guide-vane assembly formed by blades 329 is represented by the arrows 330 and it is desired to achieve a velocity distribution at the level of the chain line 331 indicated by the arrows 332, thereby to deflect the gas towards the inner and outer walls 121a and 121b and to suppress separation of the fluid from the walls and increase efficiency of diffusion, then the blades will conveniently be given a profile such as is illustrated in Figure 7, so that the outer part of each blade imparts a radially outward component of velocity to the working fluid and the inner part of each blade imparts a radially inward component of velocity to the working fluid. It will be seen therefore that since the spanwise axes 329a of the blades 329 are curved and the blades are profiled as shown in Figure 7, the inclination of the convex surface of each blade 329 to the radial direction 29b decreases from adjacent the inner wall of the duct 121b to adjacent the midspan of the blade and then increases in the opposite sense to adjacent the outer wall of the duct 121a.

An arrangement achieving a redistribution of velocity such as is illustrated in Figure 5, may be employed with advantage in a compressor, such as 20, by making the stator blades of an intermediate stage or stages of a compressor curved similarly to the blades 329 to correct an undesirable distribution of velocity which may have developed due to boundary layer effects.

The blades 229, 329 can be supported in position in any convenient manner, for example, as shown, the blades are provided with tablets 33 at each end which tablets abut one another circumferentially and are located axially by axially-facing shoulders 34 formed by recesses cut in the walls of the working fluid annulus.

I claim:

1. In combination, an annular fluid-conveying duct structure having an inner wall and an outer wall encircling and radially spaced from said inner wall to afford an annular axially-extending fluid passage with an inlet at one end of the duct structure and an axially-spaced outlet at the other end of the duct structure so that the principal direction of flow of the conveyed fluid is axially of the duct structure, and a guide vane assembly comprising a set of blades distributed circumferentially around the fluid passage, each blade of the guide vane assembly being mounted to extend outwardly across the passage from said inner wall to said outer wall, and each blade of the guide vane assembly being cambered to have a convex surface on one side extending from its leading edge to its trailing edge, and to have a concave surface on the other side extending from its leading edge to its trailing edge, and the blade being bent along its span so that along that part of its span adjacent the inner wall of the duct the convex surface faces towards the outer wall, and along that part of its span adjacent the outer wall of the duct the convex surface faces towards the inner wall.

2. In combination, an annular fluid-conveying duct structure having an inner wall and an outer wall encircling and radially spaced from said inner wall to afford an annular axially-extending fluid passage with an inlet at one end of the duct structure and an axially-spaced outlet at the other end of the duct structure so that the principal direction of flow of the conveyed fluid is axially of the duct structure, and a guide vane assembly comprising a set of blades distributed circumferentially around the fluid passage, each blade of the guide vane assembly being mounted to extend outwardly across the passage from said inner wall to said outer wall, and each blade of the guide vane assembly being cambered to have a convex surface on one side extending from its leading edge to its trailing edge, and to have a concave surface on the other side extending from its leading edge to its trailing edge, and the blade being bent along its span so that along that part of its span adjacent the inner wall of the duct the convex surface faces towards the outer wall, and along that part of its span adjacent the outer wall of the duct the convex surface faces towards the inner wall, each of the blades of the guide vane assembly being bent to have a curved spanwise axis so that the inclination of the convex surface to the radial direction decreases from adjacent the inner wall of the duct to adjacent the mid span of the blade and then increases in the opposite sense to adjacent the outer wall of the duct.

3. In combination, an annular fluid-conveying duct structure having an inner wall and an outer wall encircling and radially spaced from said inner wall to afford an annular axially-extending fluid passage with an inlet at one end of the duct structure and an axially-spaced outlet at the other end of the duct structure so that the principal direction of flow of the conveyed fluid is axially of the duct structure, and a guide vane assembly comprising a set of blades distributed circumferentially around the fluid passage, each blade of the guide vane assembly being mounted to extend outwardly across the passage from said inner wall to said outer wall, and each blade of the guide vane assembly being cambered to have a convex surface on one side extending from its leading edge to its trailing edge, and to have a concave surface on the other side extending from its leading edge to its trailing edge, and the blade being bent along its span so that along that part of its span adjacent the inner wall of the duct the convex surface faces towards the outer wall, and along that part of its span adjacent the outer wall of the duct the convex surface faces towards the inner wall, each of the the blades of the guide vane assembly being bent to have a curved spanwise axis so that the inclination of the convex surface to the radial direction decreases from adjacent the inner wall of the duct to adjacent the mid span of the blade and then increases in the opposite sense to adjacent the outer wall of the duct, the said inner and outer walls having a substantial axial extent downstream of the guide vane assembly and the walls being parallel to one another.

4. In combination, an annular fluid-conveying duct structure having an inner wall and an outer wall encircling and radially spaced from said inner wall to afford an annular axially-extending fluid passage with an inlet at one end of the duct structure and an axially-spaced outlet at the other end of the duct structure so that the principal direction of flow of the conveyed fluid is axially of the duct structure, and a guide vane assembly comprising a set of blades distributed circumferentially around the fluid passage, each blade of the guide vane assembly being mounted to extend outwardly across the passage from said inner wall to said outer wall, and each blade of the guide vane assembly having a cranked form and comprising a radially inner portion with its spanwise axis rectilinear and inclined in one sense to a radius which extends from the duct axis through the point of intersection of the spanwise axis with said inner wall and having a convex surface facing outwardly and a concave surface facing inwardly to impart an inward component of velocity to the conveyed fluid, and each blade having a radially outer portions with its spanwise axis rectilinear and inclined to said radius in the opposite sense and having a convex surface facing inwardly and a concave surface facing outwardly to impart an outward component of velocity to the conveyed fluid.

5. In combination, an annular fluid-conveying duct structure having an inner wall and an outer wall encircling and radially spaced from said inner wall to afford an annular axially-extending fluid passage with an inlet at one end of the duct structure and an axially-spaced outlet at the other end of the duct structure so that the principal direction of flow of the conveyed fluid is axially of the duct structure, and a guide vane assembly comprising a set of blades distributed circumferentially around the fluid passage, each blade of the guide vane assembly being mounted to extend outwardly across the passage from said inner wall to said outer wall, and each blade of the guide vane assembly having a cranked form and comprising a radially inner portion with its spanwise axis rectilinear and inclined in one sense to a radius which extends from the duct axis through the point of intersection of the spanwise axis with said inner wall and having a convex surface facing outwardly and a concave surface facing inwardly to impart an inward component of velocity to the conveyed fluid, and each blade having a radially outer portion with its spanwise axis rectilinear and inclined to said radius in the opposite sense and having a convex surface facing inwardly and a concave surface facing outwardly to impart an outward component of velocity to the conveyed fluid, said inner and outer walls having substantially axial extent downstream of said guide vane assembly and diverging in the direction of flow of fluid therebetween to provide a diffuser channel.

References Cited in the file of this patent

UNITED STATES PATENTS

| | | |
|---|---|---|
| 1,047,663 | Lawaczeck | Dec. 17, 1912 |
| 1,062,258 | Schlotter | May 20, 1913 |
| 1,641,665 | Devaud | Sept. 6, 1927 |
| 2,029,813 | De May | Feb. 4, 1936 |
| 2,110,679 | Robinson | Mar. 8, 1938 |
| 2,355,413 | Bloomberg | Aug. 8, 1944 |
| 2,426,270 | Howell | Aug. 26, 1947 |
| 2,650,752 | Hoadley | Sept. 1, 1953 |

FOREIGN PATENTS

| | | |
|---|---|---|
| 27,409 | Great Britain | of 1906 |
| 81,192 | Switzerland | Aug. 20, 1918 |
| 138,404 | Great Britain | Feb. 12, 1920 |
| 823,441 | France | Oct. 18, 1937 |